United States Patent Office 3,213,876
Patented Oct. 26, 1965

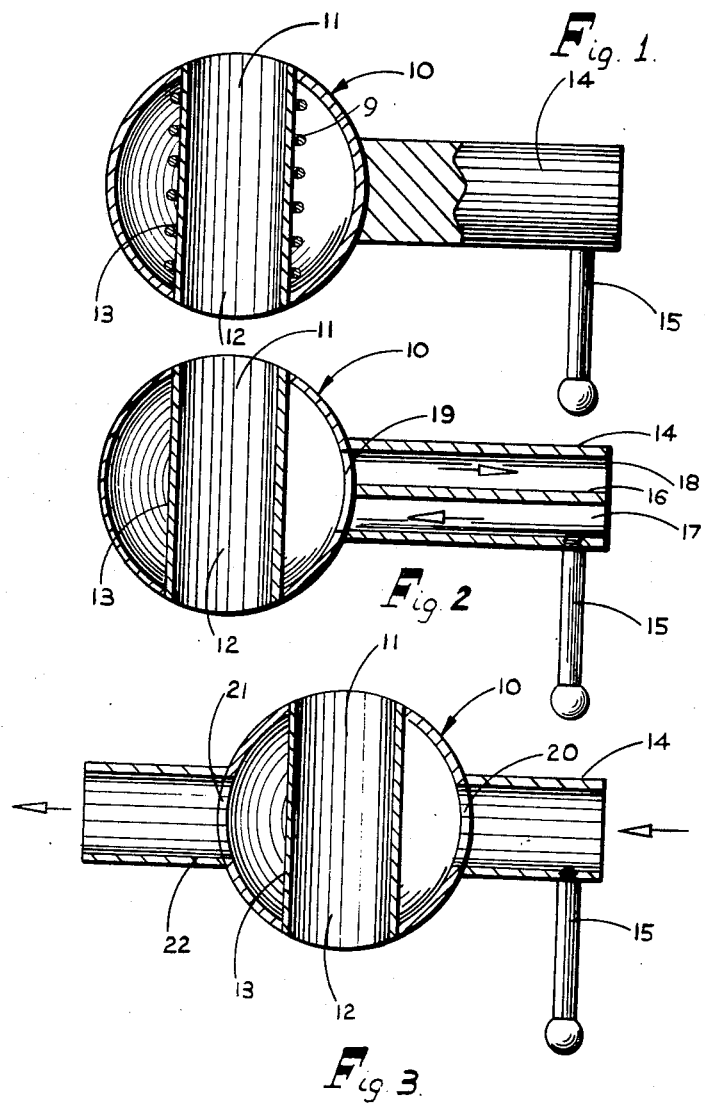

3,213,876
BALL VALVES
Douglas Norman Manton, 235 Ulverley Green Road,
Olton, Solihull, England
Filed Sept. 13, 1963, Ser. No. 308,858
Claims priority, application Great Britain, Sept. 13, 1962,
34,913/62
1 Claim. (Cl. 137—340)

This invention relates to ball valves for controlling fluids, that is gases and liquids and including fluids which may require to be temperature controlled at the valve. The invention is specifically concerned with valves of the kind comprising an externally spherical valve member mounted for turning movement in an internally spherical seating, the valve member being formed with a passage therethrough which can be brought into and out of alignment with ports in the valve seating to open and close the valve. (Such a valve member is hereinafter for convenience referred to as a valve member of the kind specified.)

Such valve members have been formed as substantially solid members traversed by a diametral passage, for instance a solid sphere which is bored to form the passage or an externally spherical member formed by forging a short length of thick-walled tube so that the cross-sectional area of the diametral passage is usually slightly greater in its mid-region than at its ends.

The invention will now be described with reference to the accompanying drawings in which:

FIGURES 1, 2 and 3 are part sectional views of three embodiments of my invention.

With reference to FIGURE 1 of the drawings the valve member includes a hollow sphere 10 provided with a pair of diametrically opposed openings 11 and 12 and a tubular member 13 the ends of which are coincident with, and in fluid-tight engagement with, the boundaries of the openings 11 and 12.

The hollow sphere 10 is provided with a valve stem 14 which has an operating handle 15 secured to it. By turning the valve stem 14 about its axis the openings 11 and 12 can be brought into or out of register with ports in the valve seating (not shown).

An electrical heating coil 9 is wound around the tubular member 13 to effect heating of a fluid passing through the valve.

With reference to FIGURE 2 of the drawings the valve member includes a sphere 10 formed with openings 11 and 12 and a tubular member 13. The sphere 10 is provided with a valve stem 14 which has an operating handle 15. The valve stem 14 is provided with a central dividing web or partition 16 so as to provide an inlet passage 17 and an outlet passage 18 for the circulation of a temperature controlling fluid in the interspace between the tubular member 13 and the internal wall of the hollow sphere 10. An opening 19 is formed in the sphere 10 at right angles to the openings 11 and 12 and the valve stem 14 is secured in a fluid-tight manner to the periphery of this opening 19. The temperature controlling fluid may be a hot gas, vapour or liquid.

With reference to FIGURE 3 of the drawings the valve member includes a hollow sphere 10 formed with openings 11 and 12 and a tubular member 13. The sphere is provided with a hollow valve stem 14 which constitutes an inlet passage for the introduction of a temperature controlling fluid into the interspace between the tubular member and the internal wall of the sphere.

An opening 20 is formed in the sphere 10, which opening communicates with the inlet passage constituted by the hollow valve stem 14. A diametrically opposed opening 21 communicates with an outlet passage constituted by the hollow member 22. The openings 20 and 21 are formed at right angles to the openings 11 and 12.

What I then claim is:
A rotary spherical valve member comprising:
(1) a hollow sphere of uniform wall thickness formed with a pair of diametrically opposed circular apertures,
(2) a tubular member mounted internally of the sphere with its open ends co-incident with and secured in a fluid-tight manner to the peripheries of the apertures formed in the sphere so as to provide a passageway through said sphere,
(3) a valve stem secured to said sphere and extending radially of said sphere at right angles to said tubular member,
(4) an operating handle secured to said valve stem, and
(5) means in the valve member for heating a fluid passing through the passageway defined by said tubular member.

References Cited by the Examiner
UNITED STATES PATENTS
2,646,065   7/53   Tyson _____ 137—341

FOREIGN PATENTS
1,172,335   10/58  France.
1,256,454   2/61   France.
407,010    2/34   Great Britain.

M. CARY NELSON, Primary Examiner.
HENRY T. KLINSIEK, Examiner.